(12) United States Patent
Untch

(10) Patent No.: US 12,172,802 B2
(45) Date of Patent: Dec. 24, 2024

(54) DOCKING SEAL AND DOCKING METHOD FOR THE CONTAMINATION-FREE CONNECTION OF A FIRST FLEXIBLE CASING WITH A SECOND FLEXIBLE CASING, FIRST AND SECOND FLEXIBLE CASINGS CONNECTABLE CONTAMINATION-FREE USING SUCH DOCKING SEAL AS WELL AS USE OF SUCH DOCKING SEAL FOR THE SAFE HANDLING OF TOXIC POWDERY PARTICULATE SUBSTANCES

(71) Applicant: Andocksysteme G. Untch GmbH, Badenweiler (DE)

(72) Inventor: Günter Untch, Badenweiler (DE)

(73) Assignee: Andocksysteme G. Untch GmbH, Badenweiler (DE)

( * ) Notice: Subject to any disclaimer, the term of this patent is extended or adjusted under 35 U.S.C. 154(b) by 951 days.

(21) Appl. No.: 16/980,138

(22) PCT Filed: Mar. 11, 2019

(86) PCT No.: PCT/EP2019/056058
§ 371 (c)(1),
(2) Date: Sep. 11, 2020

(87) PCT Pub. No.: WO2019/175121
PCT Pub. Date: Sep. 19, 2019

(65) Prior Publication Data
US 2021/0053782 A1    Feb. 25, 2021

(30) Foreign Application Priority Data
Mar. 12, 2018    (DE) .................. 10 2018 105 676.1

(51) Int. Cl.
*B65D 33/25*    (2006.01)
*B65G 69/18*    (2006.01)

(52) U.S. Cl.
CPC ..... *B65D 33/2541* (2013.01); *B65D 33/2566* (2013.01); *B65G 69/183* (2013.01)

(58) Field of Classification Search
CPC ........... B65D 33/2541; B65D 33/2566; B65G 69/183
See application file for complete search history.

(56) References Cited

U.S. PATENT DOCUMENTS 7,082,648 B2    8/2006  Morioka et al.
8,060,992 B2    11/2011 Koch et al.
(Continued)

FOREIGN PATENT DOCUMENTS

DE    102004018812    11/2004
DE    102004003511    4/2007
(Continued)

OTHER PUBLICATIONS

Patent Cooperation Treaty, "International Search Report," and English translation of international search, Issued in International Patent Application No. PCT/EP2019/056058, date Jun. 14, 2019, document of 6 pages.
(Continued)

*Primary Examiner* — David M Upchurch
(74) *Attorney, Agent, or Firm* — Akerman LLP; Peter A. Chiabotti

(57) ABSTRACT

A docking seal for the contamination-free connection of a first flexible casing or enveloping enclosure with a second flexible casing, comprising a first seal device which is connectable or is connected with the first casing, and a second seal device which is connectable or is connected with the second casing, wherein the first seal device includes a (Continued)

first docking port, a first end port and a first slider, and the second seal device comprises a second docking port, a second end port and a second slider. The invention, furthermore, relates to a docking method for the contamination-free connection of a first flexible casing with a second flexible casing with such a docking seal.

20 Claims, 6 Drawing Sheets

(56) References Cited

U.S. PATENT DOCUMENTS

| | | | |
|---|---|---|---|
| 9,016,036 B2 | 4/2015 | Untch | |
| 10,124,931 B2 | 11/2018 | Koch et al. | |
| 2008/0276435 A1 | 11/2008 | Koch et al. | |
| 2012/0074341 A1 | 3/2012 | Untch | |
| 2012/0090279 A1* | 4/2012 | Untch | B65G 69/183 383/42 |
| 2012/0124789 A1 | 5/2012 | Untch et al. | |

FOREIGN PATENT DOCUMENTS

| | | |
|---|---|---|
| DE | 202009018082 | 2/2011 |
| DE | 202010015525 | 2/2011 |
| DE | 102011009303 | 3/2012 |
| DE | 102013000011 | 7/2014 |
| EP | 0097514 | 1/1984 |
| JP | 2011087875 | 5/2011 |
| WO | 2005/070776 | 8/2005 |
| WO | 2014/076208 | 5/2014 |

OTHER PUBLICATIONS

German Patent Office, "Office Action," issued in German Patent Application No. DE 10 2018 105 676.1, dated Oct. 19, 2018, document of 10 pages.

* cited by examiner

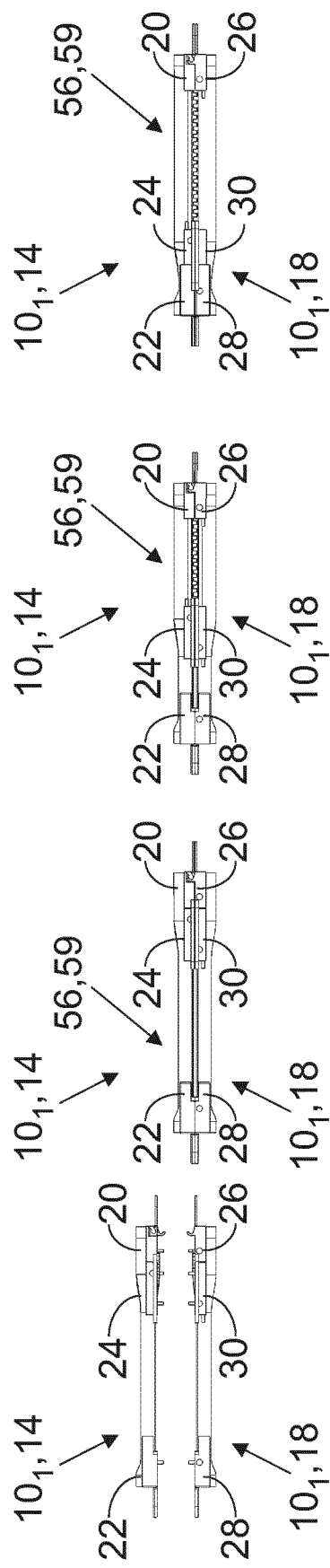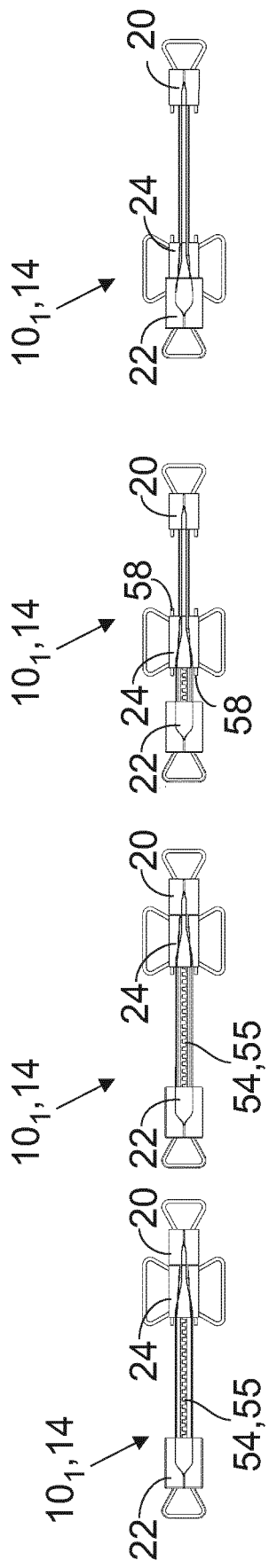

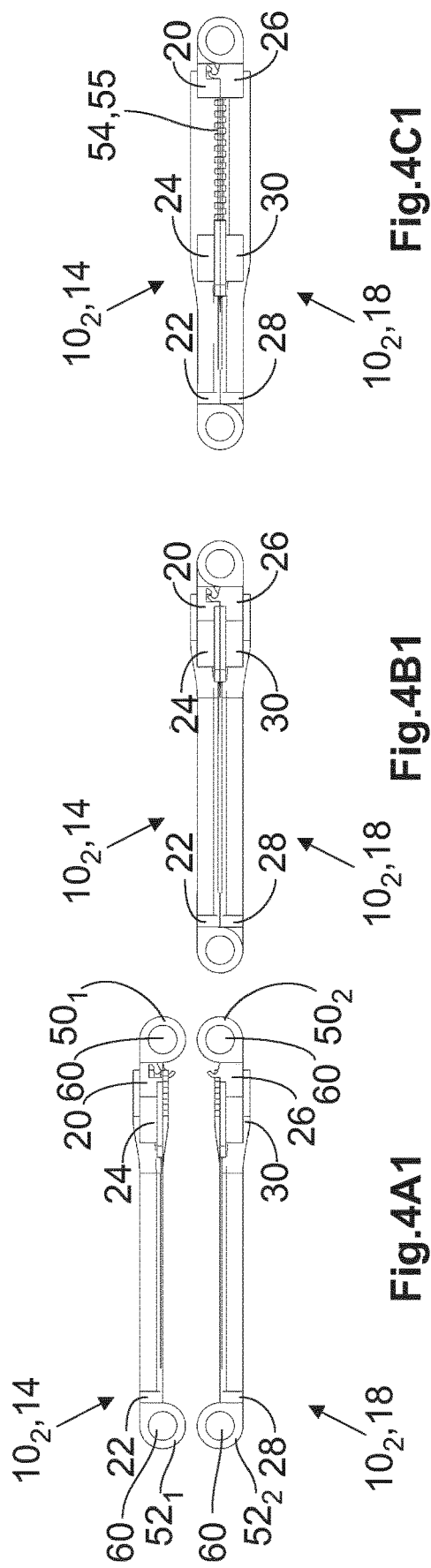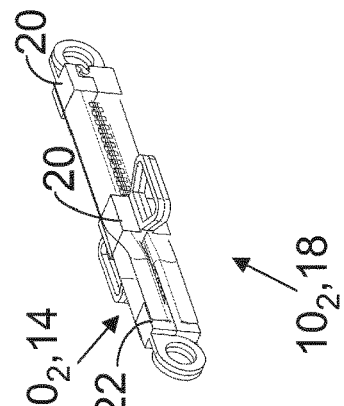

DOCKING SEAL AND DOCKING METHOD FOR THE CONTAMINATION-FREE CONNECTION OF A FIRST FLEXIBLE CASING WITH A SECOND FLEXIBLE CASING, FIRST AND SECOND FLEXIBLE CASINGS CONNECTABLE CONTAMINATION-FREE USING SUCH DOCKING SEAL AS WELL AS USE OF SUCH DOCKING SEAL FOR THE SAFE HANDLING OF TOXIC POWDERY PARTICULATE SUBSTANCES

CROSS REFERENCE TO RELATED APPLICATIONS

This application is a § 371 National Phase of PCT/EP2019/056058, filed Mar. 11, 2019, which claims priority to German Patent Application No. 10 2018 105 676.1, filed Mar. 12, 2018.

BACKGROUND

The present application relates to a docking seal and a docking method for the contamination-free connection of a first flexible casing or enveloping enclosure with a second flexible casing. The application relates furthermore to a first and a second flexible casing that are connectable with one another contamination-free using such a docking seal. The application, moreover, relates to the use of such a docking seal for the safe handling of toxic powdery particulate substances.

Known shut-off devices, for example a double-disk, are each supported in a housing and disposed in the particular housing such that the shut-off devices in the docking position are at least with a portion of their interfaces in contact on one another and are sealed relative to one another.

Onto such a shut-off device, such as [is disclosed], for example [in] DE 10 2011 009 303 A1, forces can be applied by means of heavy housings and rigid bearings restricted to a rotational axis region in order to be in contact on one another as leak-free and as much as possible over the full circumference.

In another technical field of container lock technology, [as described] for example in WO 2014/076208 A1, a sealed container with a first flange is shown which can be closed with a first door and be sealed. The door is secured with an articulation on the flange. Consequently, this does not involve a multiple hinged cover with rotational axis internal to the cover but rather a lock device, quasi a lid. This lid is said to be suitable with its connection environment for the sealed transfer between such a container and a closed volume, wherein the closed volume comprises a further flange which can be connected to the first flange by means of a bayonet lock system.

EP 0 097 514 B1 proposes a method for establishing a safe passage between two protective enclosures, of which at least one can be portable and ensure a protected environment for the persons or objects located therein. The enclosures comprise enveloping structures with panels with openings therein. At least one of the panels is to be sufficiently flexible for one of its opening to correspond to the opening in another panel, wherein these openings are dimensioned and disposed such that they are substantially co-extensive when the panels are in an abutting position and the openings between the enclosures establish a connecting passage. The method according to this prior art comprises the closing of each opening by means of a number of fasteners, whereby the closing shall be controlled. The fasteners are to be secured on the appropriate panels and laid out for the purpose of being repeatedly opened or closed by means of a slide device. The slide device is to be brought into engagement with the fasteners in order to bring the fasteners of the one panel and also the fasteners of the other panel into engagement with one another.

Thereby the openings in the panels are said to be closed when the panels are separated. Furthermore, the slide device is to be brought into engagement with all fasteners and the slide device is to be moved in the opposite direction in order to engage the slide devices of the one panel with the slide devices of the corresponding other panel to connect the panels and to open a passage through the connected panels.

DE 10 2004 018 812 B4 discloses an air- and water-tight zipper. A flange section extends about a block of an end part. Hereby an air- and water-tight brace is to be secured more strongly on the flange section. In this manner, the zipper is also to remain sealed even when being folded.

Docking seals for the contamination-free connection of a first flexible casing with a second flexible casing are disclosed, for example, in DE 20 2009 018 082 U1, in DE 10 2013 000 011 A1 and in DE 10 2004 511 B4.

A safely, securely and simply manipulatable docking seal or an appropriate docking method for the contamination-free connection of a first flexible casing with a second flexible casing is not known in prior art.

SUMMARY

The problem addressed by an embodiment of the present disclosure is to provide a securely manipulatable docking seal and a corresponding docking method with which two flexible casings can be connected contamination-free with one another and a throughflow channel for the contamination-free transport of substances between the first casing and the second casing can be provided, wherein the two flexible casings are to be relockable and resealable again.

One embodiment of the present disclosure, furthermore, is based on the problem of providing two flexible casings which can be connected contamination-free with one another and are reclosable and resealable again. In addition, one development of the present disclosure has as its basis the problem of proposing an application for the safe handling of toxic powdery particulate substance, in particular during the partial removal from flexible casings, such as original packaging, for the purpose of sampling and weighing.

This problem is resolved with the characteristics specified in the present disclosure.

One embodiment of the disclosure relates to a docking seal for the contamination-free connection of a first flexible casing with a second flexible casing, comprising a first seal device which is connectable or is connected with the first casing, and a second seal device which is connectable or is connected with the second casing, wherein the first seal device comprises a first docking port, a first end port and a first slider and the second seal device comprises a second docking port, a second end port and a second slider, the first slider and the second slider being slidable between a docking position and a throughflow position, wherein in the docking position the first casing is closed within the first seal device thereby [seal device], and the second casing within the second seal device is closed thereby [seal device]; in the docking position the first slider is in contact on the first docking port, and the second slider is in contact on the second docking port; the first docking port and the second docking port are detachably connectable with one another, and, if the first docking port and the second docking port are connected with one another, the first slider and the second slider during the sliding in the direction of the throughflow position, in which the first slider is in contact on the first end port and the second slider is in contact on the second end port, the first casing and the second casing open and provide a throughflow channel, enclosed by the first seal device and the second seal device, for the contamination-free transport of substances between the first casing and the second casing.

By flexible casings are understood primarily packagings, but also flexible pipe connections and the like. The docking seal according to the disclosure enables the contamination-free connecting of two flexible casings as well as also the reclosure and resealing such that they can again be separated from one another contamination-free. To this extent, a detachable connection between the two casings is involved. The transport of substances, in particular of high-quality pharmaceutical products and/or toxic substances between the two flexible casings can take place rapidly, securely and safely by means of the proposed docking seal without engendering the risk of contamination. The substance itself as well as also persons in the environments of the two casings are protected.

The first and the second slider, also denoted as shut-off devices, operate according to the slide closure principle. The two casings are connected with the corresponding docking ports and end ports and are, in particular, clamped therewith. In the docking position the casings are closed with the seal devices, wherein the sliders are in contact on the docking port. By sliding them into the throughflow position, in which the sliders are in contact on the end port, the casings are opened such that a throughflow channel, enclosed by the seal devices, is provided, through which a substance can be transported contamination-free between the first and the second casings. The docking and sliding of the slider from the docking position into the throughflow position is very simple and can be executed rapidly, precisely as the separation of the two casings from one another, for which purpose the slider is slid from the throughflow position into the docking position and the docking ports are separated from one another. The first and the second seal device can each comprise a zipper or a zip closure.

According to the disclosure, the first end port and the second end port are connectable such that they are detachable. Like the docking ports, the two end ports have the task to clamp in the two flexible casings and to give them defined form. To accomplish this, the flexible casings can be clamped into the docking ports and the end ports, wherein the docking ports and the end ports can be developed as one part or as two parts. The docking ports and the end ports serve furthermore as abutment for the two sliders, whereby the docking position and the throughflow position can be uniquely defined. Depending on the physical form of the seal devices, it is not necessary for the end ports also to be connected with one another.

Nevertheless, it is useful to develop the end ports also such that they are connectable with one another, whereby the position of the two casings relative to one another is more precisely defined and does not change during operation of the docking seal. Damages of the casings are hereby avoided during the sliding of the sliders, especially into the throughflow position.

In a further developed embodiment, the first slider and the second slider can be detachably connectable with one another. If the two sliders are connected with one another, the actuation of one slider suffices to slide both sliders back and forth between the docking position and the throughflow position. The docking seal can be operated from one side such that bilateral accessibility is not necessary for the operator. Manipulation of the docking seal is hereby simplified. Moreover, it can hereby be ensured that both casings are simultaneously opened and closed in the same manner. Error operations that could result from one slider being in the docking position and the other slider in the throughflow position, are hereby avoided.

In a further developed embodiment, the first slider and/or the second slider can each comprise an actuation section. Sliding the slider between the docking position and the throughflow position is hereby facilitated.

According to a further embodiment, the docking seal comprises a slide closure for the connection of the first seal device with the second seal device which [slide closure] is closable by sliding the first slider and/or the second slider into the throughflow position. Especially when the docking port as well as also the end port are connectable with one another and an especially tight connection is established between the docking port and the end port, the first and the second seal device can be connected with one another such that they cannot detach from one another during operation of the docking seal. Detachment must in any case be prevented since otherwise the contamination-free transport of the substances between the first and the second casing is no longer ensured. Especially when the end port serves only as an abutment without a tight connection existing between the docking port and the end port, the slide closure serves for the purpose that the first seal device and the second seal device are also connected between the particular docking ports and end ports with one another such that the two seal devices, and consequently the two casings, cannot detach from one another in the throughflow position. The contamination-free transport of the substances between the first and the second casing is therewith ensured. For this purpose, the slide closure can also have the physical form of a zipper or zip closure connecting the two seal devices.

A further embodiment is distinguished thereby that the slide closure comprises sealing means which [engaging seals] can be brought into sealing contact with one another when the first slider and/or the second slider are slid into the throughflow position. The sealing means increase the process safety and reliability since, apart from the slide closure as such, the sealing means ensure the contamination-free transport of substances between the first and the second casing.

In a further embodiment, at least one of the docking ports can comprise a docking port suspension element. With the docking port suspension element, the transport and the storage of the docking seals can be simplified since these can be suspended on a hook. Moreover, a user can easily take hold of the docking seal using the docking port suspension element.

A further developed embodiment is distinguished thereby that at least one of the end ports comprises an end port suspension element. The transport and storage of the docking seals are hereby also simplified. A user can, in addition, easily take hold of the docking seal using the end port suspension element.

According to a further embodiment, the docking port suspension element and the end port suspension element encompass an opening whose plane extends substantially parallel to a main transit direction of the substance between the first casing and the second casing. If the two casings are separated from one another, they can be sealed in the following manner: the particular casing is wound about the seal device connected thereto and the seal device is bend such that the two suspension elements are connectable with one another by means of a zip tie for example. In particular with the casings empty, it can in this manner be safely prevented that residues of the substances escape, especially if these are toxic.

A further embodiment is distinguished thereby that the docking port suspension element and the end port suspension element can be placed one into the other. For this purpose, one of the suspension elements can, for example, comprise a recess into which the other suspension element can be placed. The positions of the two suspension elements with respect to one another when sealing the particular casings are hereby uniquely defined.

A further embodiment is characterized thereby that at least the first docking port and the second docking port comprise corresponding positioning sections for the positioning of the docking ports relative to one another. The positioning sections, which can comprise receiving contours, define the positions of the docking port with respect to one another, which facilitates the connecting of the docking ports. The end ports can also comprise such positioning sections if they are connectable with one another. Sufficiently precise positioning of the two seal devices with respect to one another is an important prerequisite for a contamination-free connection between the two casings. The positioning sections ensure sufficiently precise positioning.

In a further embodiment, at least the first docking port and the second docking port can comprise form-closure means and/or friction-closure means for the detachable connection of the docking ports with one another. In the case the end ports are connectable with one another, the end ports can also comprise such form-closure means and/or friction-closure means. As form-closure means can be used, for example clip connections. As friction-closure means can be utilized conical projections which can be slid into corresponding recesses. The form-closure means and the friction-closure means are simple of production and operation.

One physical form of the disclosure relates to a method for the contamination-free connection of a first flexible casing with a second flexible casing with a docking seal according to one of the previous docking seals, comprising the following steps:
  providing a first seal device with a first docking port, a first end port and a first slider,
  providing a second seal device with a second docking port, a second end port and a second slider,
  wherein the first seal device and the second seal device are in a docking position in which the first casing within the first seal device is closed off by the latter and the second casing within the second seal device is closed off by the latter, and in which the first slider is in contact on the first docking port and the second slider is in contact on the second docking port,
  connecting the first docking port with the second docking port, and
  sliding the first slider and the second slider in the direction toward a throughflow position in which the first slider is in contact on the first end port and the second slider is in contact on the second end port, whereby the first casing and the second casing are opened and a throughflow channel, encompassed by the first seal device and the second seal device, is established for the contamination-free transport of substances between the first casing and the second casing.

The technical effects and advantages that can be achieved with the proposed docking method correspond to those discussed for the present docking seal. In summary, reference is made to the fact that the transport of substances, in particular of pharmaceutical products of high quality and value and/or toxic substances between the two flexible casings by means of the proposed docking method can take place quickly and safely without the risk of contamination being generated. The substance itself as well as also persons within the surrounding area of the two casings are protected.

According to the disclosure, the method comprises the step of connecting the first end port with the second end port. The position of the two casings with respect to one another is more precisely defined and, during operation of the docking seal, is not changed. Damages to the casings during the sliding of the sliders, especially into the throughflow position, are hereby avoided.

The method, moreover, in a further developed physical form can comprise the step of connecting the first slider with the second slider. If the two sliders are connected with one another, the actuation of one of the sliders is sufficient to slide both sliders back and forth between the docking position and the throughflow position. The docking seal can be operated from one side such that bilateral accessibility for the operator is not necessary. The manipulation of the docking seal is hereby simplified. Moreover, it can hereby be ensured that both casings are opened and closed simultaneously and in the same manner. Error operations that could result fro one slider being in the docking position and the other slider in the throughflow position, are hereby avoided.

One physical form of the disclosure relates to a first flexible casing, in particular packaging means for powdery toxic particulate substances such as raw materials, auxiliary materials and finished stock in the chemical and pharmaceutical industry, wherein the flexible casing is sealable by means of a docking seal according to one of the previous embodiments, wherein, by means of the docking seal, a second flexible casing, by means a docking method according to one of the previously discussed embodiments, is contamination-free dockable to the first flexible casing and simultaneously jointly openable and again undockable and again sealable.

One physical form of the disclosure relates to the use of a docking seal as in one of the preceding embodiments for the safe handling of substances, in particular of toxic powdery particulate substances, for example during the partial removal from flexible casings such as original packagings for the purpose of sampling and/or weighing.

The technical effects and advantages that can be achieved with the proposed casing and the proposed use of the docking seal correspond to those that have been discussed for the present docking seal. In summary, reference is made to the fact that the transport of substances, in particular of pharmaceutical products of high quality and value and/or of toxic substances, between the two flexible casings can take place rapidly and safely, without the risk of contamination being incurred. The substance itself as well as also persons within the surrounding environments of the two casings are protected.

BRIEF DESCRIPTION OF THE DRAWINGS

Exemplary embodiments of the present application will be explained in greater detail in the following with reference to the attached drawings. Therein depict.

DETAILED DESCRIPTION

Figure 1A:
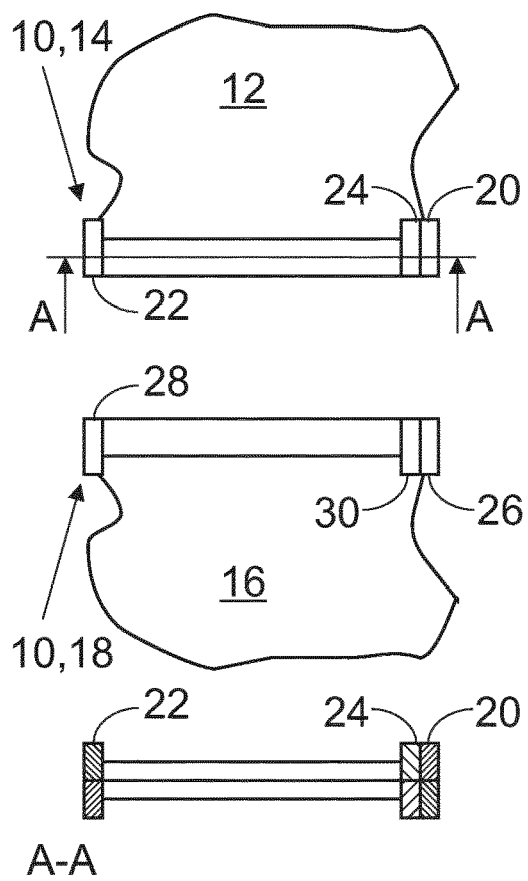
FIGS. 1A to 1C fundamental depictions to illustrate a docking method according to the present disclosure,
  FIGS. 2A to 2C different views of a first embodiment of a docking seal according to the present disclosure in which the slide is in a docking position, FIGS. 3A1 to 3D2 different views of the first embodiment depicted in FIGS. 2A to 2C of the docking seal in different positions, FIGS. 4A1 to 4C2 different views of a second embodiment of the docking seal in different positions, FIG. 5 an enlarged depiction of the first docking port suspension element and of the first end port suspension element, FIGS. 6A to 6C different dispositions of the first casing, FIGS. 7A and 7B different views of a third embodiment of the docking seal, and FIGS. 8A and 8B different views of a fourth embodiment of the docking seal.
Figure 1B:
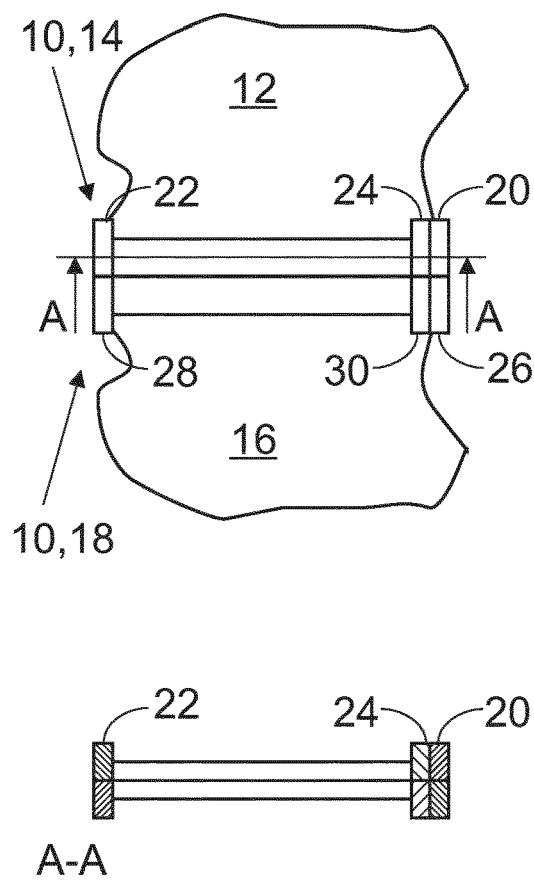
Figure 1C:
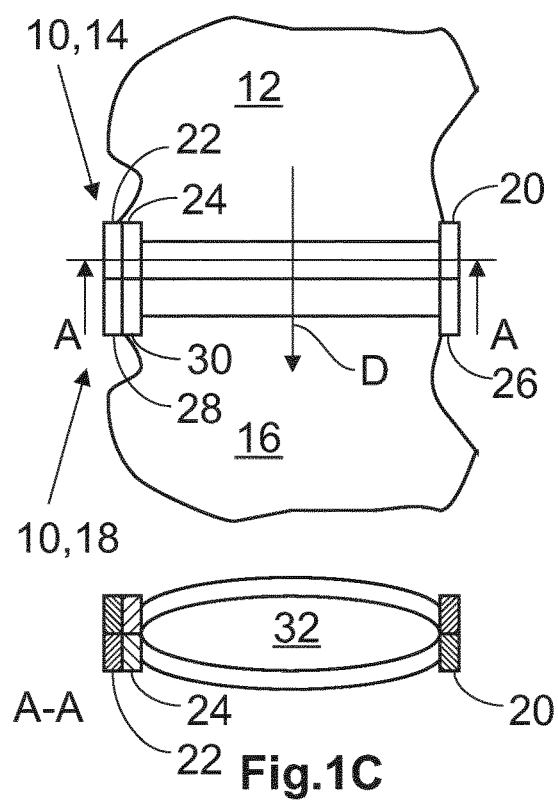

The FIGS. 1A to 1C serve for the illustration of the docking method, utilizing a docking seal 10. In FIG. 1A is connected a first flexible casing 12 with a first seal device 14 of the docking seal 10 and closed thereby [seal device 14]. Furthermore, a second flexible casing 16 is connected with a second seal device 18 of the docking seal 10 and closed thereby [seal device 18]. The first casing 12 as well as also the second casing 16 involve flexible containers which can be implemented as original packagings. In one of the casings 12, 16, in the depicted example in the first casing 12, a not depicted substance, for example a pharmaceutical and/or toxic substance, is contained. One or both casings 12, 16 can, however, also be flexible pipe connections or the like.

The first seal device 14 comprises a first docking port 20, a first end port 22 and a first slider 24 which can be slid back and forth between the first docking port 20 and the first end port 22. The second seal device 18 correspondingly comprises a second docking port 26, a second end port 28 and a second slider 30. The second slider 30 is also slidable back and forth between the second docking port 26 and the second end port 28. As is evident in the sectional representation along the section plane A-A, the first docking port 20, the first slider 24 and the first end port 22 are of a two-part structure. The first casing 12 is disposed between the two parts of the first docking port 20, of the first slider 24 and of the first docking port 20. However, a unitary physical form is also conceivable. The second docking port 26, the second slider 30 and the second end port 28 can be structured in the same way.

In FIG. 1A the first slider 24 and the second slider 30 are in a docking position, in which the first slider 24 is in contact on the first docking port 20, and the second slider 30 is in contact on the second docking port 26. In the docking position the first casing 12 is closed within the first seal device 14 by the latter. The same applies to the second casing 16. A substance, stored for example in the first casing 12, can consequently not leave the first casing 12 through the first seal device 14. The same applies also to the second casing 16, wherein, however, as already stated, in the depicted example a substance is only stored in the first casing 12.

As is discernible in FIG. 1A, the first casing 12 and the second casing 16 are disposed spaced apart. In FIG. 1B the first docking port 20 and the second docking port 26, the first slider 24 and the second slider 30 as well as the first end port 22 and the second end port 28 are in contact on one another. However, the first slider 24 and the second slider 30 are, as before, in the docking position such that the first casing 12 and the second casing 16 continue to be closed. In FIG. 1C the first slider 24 and the second slider 30 have been slid into a throughflow position in which the first slider 24 is in contact on the first end port 22 and the second slider 24 is in contact on the second end port 28. Due to the sliding of the sliders 24, 30 into the throughflow position, the first casing 12 and the second casing 16 are opened such that a throughflow channel 32 is established through which the substance can be transferred contamination-free from the first casing 12 into the second casing 16. The arrow in FIG. 1C indicates the main transit direction D of the substance through the first and the second seal device 14, 18 during the transfer from the first casing 12 into the second casing 16.

To close the two casings 12, 16 again and to separate them contamination-free from one another, the described steps are executed in reverse sequence and oppositely.

Figure 2A:
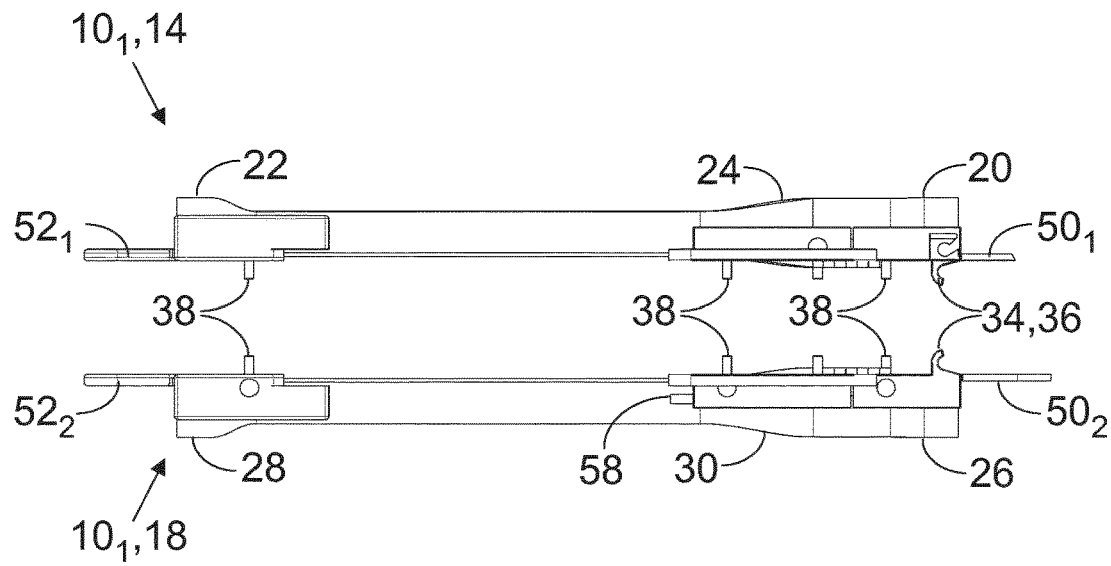
Figure 2B:
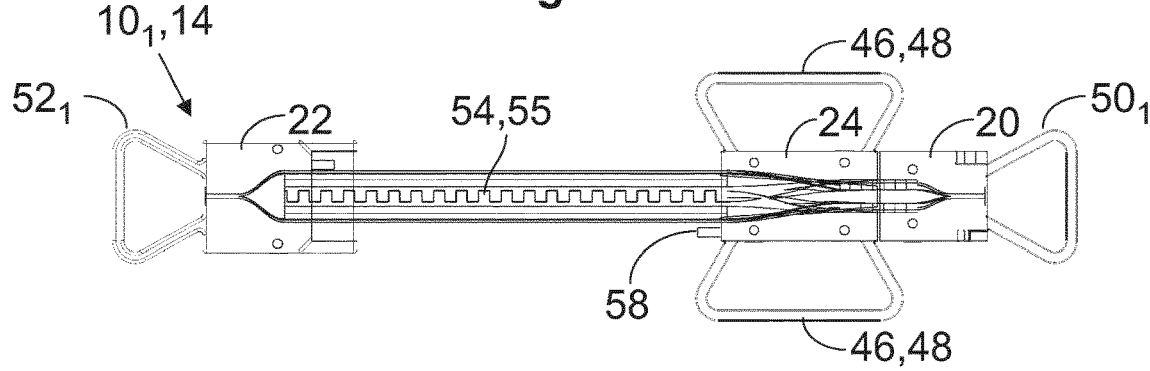
Figure 2C:
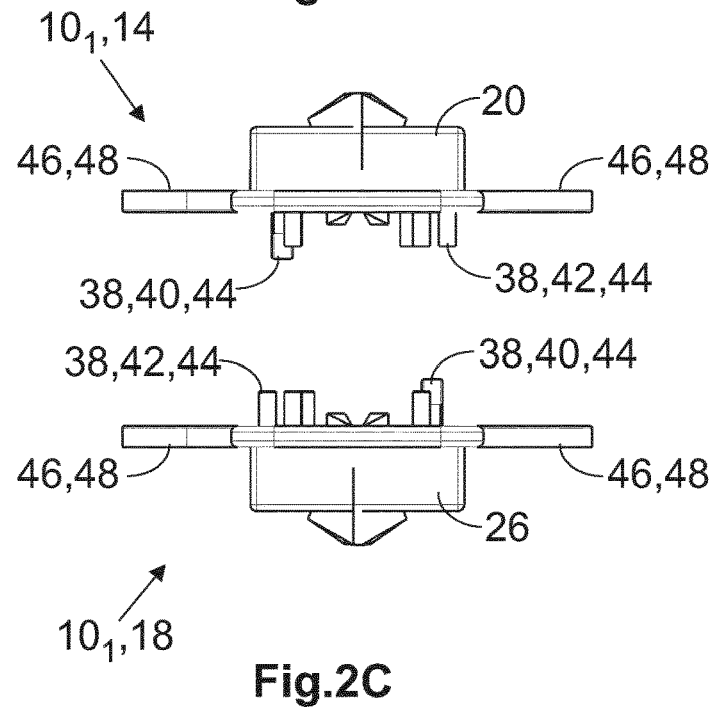

In FIG. 2A is shown a first embodiment of the docking seal 101 in conjunction with a side view, in FIG. 2B in conjunction with a plan view and in FIG. 2C in conjunction with a front view, in each instance without the casings 12, 16. The first docking port 20 and the second docking port 26 comprise form-closure means 34 with which they can be connected with one another such that they are detachable. The form-closure means 34 are developed as hooks 36 engaging into one another. The first docking port 20 and the second docking port 26, furthermore, comprise positioning sections 38 with which the position of the two docking ports 20, 26 relative to one another can be defined. The first slider 24 and the second slider 30 as well as the first end port 22 and the second end port 28 also comprise such positioning sections 38. As is especially clearly visible in FIG. 2C, some of the positioning sections 38 comprise sleeves 40 into which corresponding projections 42 with a certain oversize can be introduced such that these positioning sections 38 are developed as friction-closure means 44 with which the docking ports 20, 26, the sliders 24, 30 and/or the end ports 22, 28 can be detachably connected with one another.

As is evident in FIG. 2B, the first seal device 14 and the second seal device 18, in this regard structured identically, comprise each a first zipper 55 or a second zipper 57, respectively (see FIG. 4A2) with which the first casing 12 or the second casing 16 are closed. Instead of the zipper, a zip closure is also conceivable.

The first slider 24 as well as also the second slider 30 comprise each an actuation section 46 which comprises two handle pieces 48 projecting laterally outwardly, as is especially clearly visible in FIG. 2C.

The first docking port 20, moreover, comprises a first docking port suspension element $50_1$ and the second docking port 26 comprises a second docking port suspension element $50_2$. The first end port 22 comprises a first end port suspension element $52_1$ and the second end port 28 comprises a second end port suspension element $52_2$. With the docking port suspension element $50_1$, $50_2$ as well as also with the end port suspension element $52_1$, $52_2$ the docking seal 101 can be held and be suspended on a suspension device.

In FIGS. 3A1 to 3D2 the embodiment, depicted in FIGS. 2A to 2C, of the docking seal 101 is shown in different positions, once in conjunction with a side view and once in conjunction with a plan view. The Figures which show the same positions are denoted by the same letters.

In FIGS. 3A1 and 3A2 the two seal devices 14, 18 are disposed at a spacing from one another. In FIGS. 3B1 and 3B2 the two seal devices 14, 18 are in contact on one another and are detachably connected with the form-closure means 34 and the friction-closure means 44 at the docking ports 20, 26, at the sliders 24, 30 and at the end ports 22, 28 (s. FIGS. 2A to 2C). In FIGS. 3A1 to 3B2 the sliders 24, 30 are in contact on the docking ports 20, 26 such that, as described for FIGS. 1A to 1C, the casings 12, 16, not depicted here, are closed, which is, in particular, evident in FIGS. 3A2 and 3B2, where teeth 54 of the first zipper 55 of the first seal device 14 engage one another. As stated, the sliders 24, 30 are in the docking position.

In FIGS. 3C1 and 3C2 can be seen that the sliders 24, 30 have been slid from the docking position in the direction of the throughflow position. Since they are connected with one another by means of the form-closure element 34 and/or by means of the friction-closure element 44, the sliders 24, 30 can only be moved jointly and simultaneously. In FIG. 3C1 is clearly discernible that the docking seal 10₁ comprises a slide closure 56 for the connection of the first seal device 14 with the second seal device 18 which is closable by sliding the first slider 24 and/or the second slider 30 into the throughflow position. In FIG. 3C1 the slide closure 56 between the sliders 24, 30 and the docking ports 20, 26 is closed, while it is still open between the sliders 24, 30 and the end ports 22, 28. In FIG. 3C2 it is evident that the seal devices 14, 18 between the sliders 24, 30 and the docking ports 20, 26 are open, and between the sliders 24, 30 and the end ports 22, 28 they [seal devices] are still closed.

In FIG. 3C2 is also clearly discernible that the sliders 24, 30 comprise overall four centering projections 58 which, depending on whether the sliders 24, 30 are in the docking position or in the throughflow position, engage into not shown recesses, either of the particular docking ports 20, 26 or of the particular end port 22, 28, whereby the position of the sliders 24, 30 relative to the end ports 22, 28 or to the docking ports 20, 26 is defined.

In FIGS. 3D1 and 3D2 the sliders 24, 30 are in the throughflow position in which they are in contact on the end ports 22, 28. In FIG. 3D1 is event that the slide closure 56 is completely closed such that the first seal device 14 and the second seal device 18 are also connected with one another between the docking ports 20, 26 and the end ports 22, 28. In FIG. 3D2 it is evident that the two seal devices 14, 18 are open and establish the throughflow channel 32 through which the substance can be transferred contamination-free from the first casing 12 into the second casing 16 and conversely.

In FIGS. 3A1 to 3D2 is discernible that the first seal device 14 comprises the earlier described zipper 55 or zip closure, with which the first casing 12 can be opened and closed. The second seal device 18 correspondingly comprises a second zipper 57 or zip closure (see FIGS. 4A2) with which the second casing 16 can be opened and closed. In the docked state, the first zipper 55 or zip closure and the second zipper 57 or zip closure are in parallel planes with respect to one another, which planes extend perpendicularly to the main transit direction D (see FIG. 1C). The slide closure 56 is developed as a third zipper 59 or zip closure, however, it can also comprise a fourth zipper or zip closure (not shown). The third zipper 59 or zip closure is in a plane that extends parallel to the main transit direction D and thus perpendicularly to the plane in which extend the first and the second zipper 55, 57 or zip closure. The first and the second zippers 55, 57 therefore form with the third zipper 59 an angle of 90°. All zippers 55, 57, 59 are simultaneously actuated with the sliders 24, 30, wherein the first zipper 55 and the second zipper 57 are opened when the third zipper 59 is closed and conversely. The zippers 55, 57, 59 are in particular water-tight. Especially the third zipper 59 can be replaced by form-closure means such as a butterfly connection.

In FIGS. 4A1 to 4A2 a second embodiment of the docking seal 10₂ is shown analogously to the depictions of FIGS. 3A1 to 3D2, wherein the throughflow position according to FIGS. 3D1 and 3D2 is not shown for reasons of presentation.

The structure and mechanism of function of the second embodiment does not differ significantly from those of the first embodiment. For that reason, in the following only the differences will be elucidated. The two docking port suspension elements 50₁, 50₂ and the two end port suspension elements 52₁, 52₂ are rotated by 90° in the second embodiment of the docking seal 10₂ in comparison to the first embodiment of the docking seal 10₁ and are developed annularly. The two docking port suspension elements 50₁, 50₂ and the two end port suspension elements 52₁, 52₂ encompass each an opening 60 whose plane [extends] substantially parallel to the main transit direction D as indicated in FIG. 1C.

Figure 5:
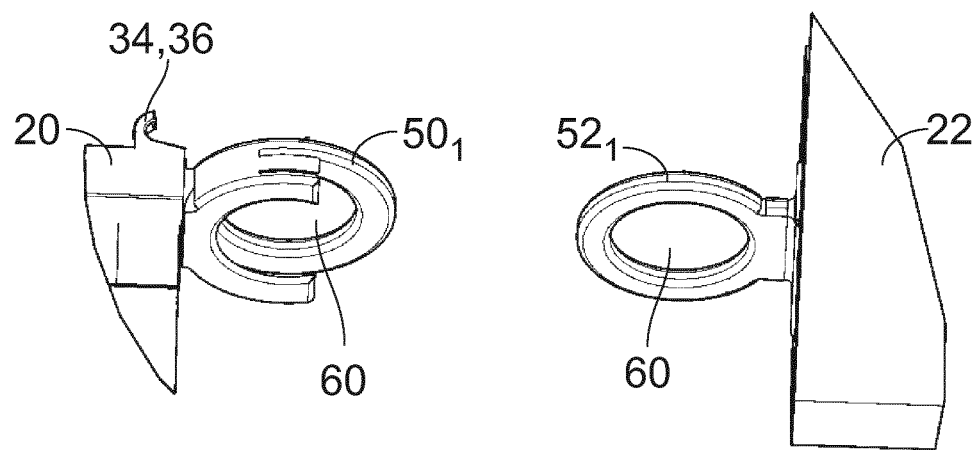
Figures 6A, 6B, 6C:
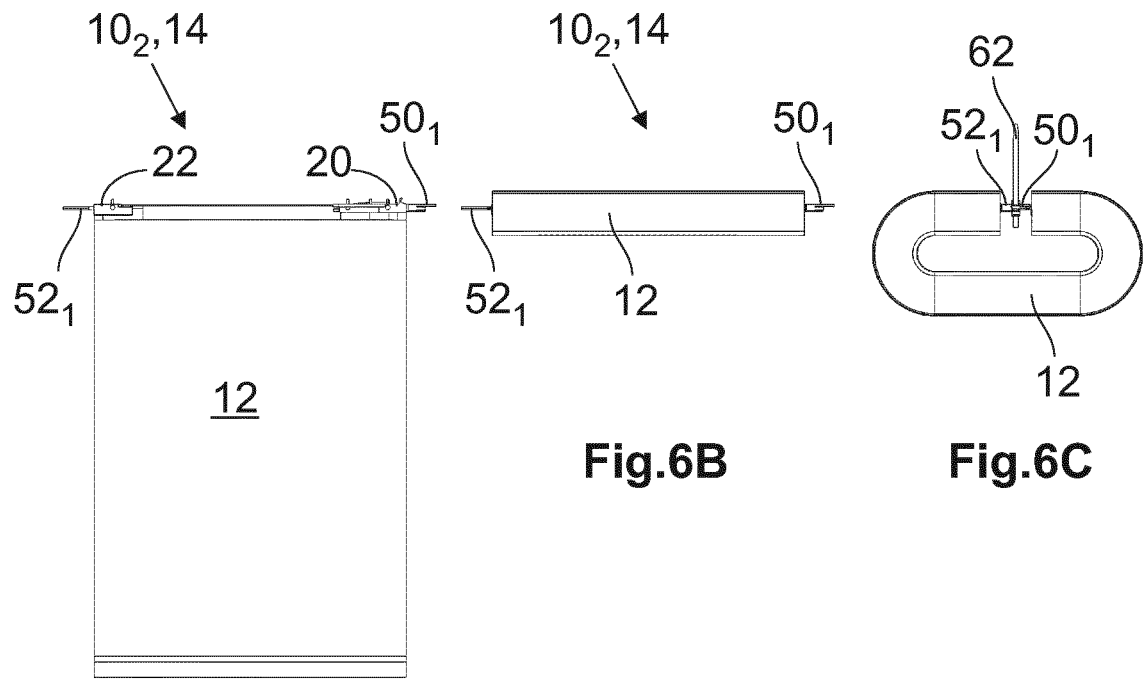

FIG. 5 shows an enlargement of the first docking port suspension element 50₁ and of the first end port suspension element 52₁. It is discernible that the first docking port suspension element 50₁ is shaped such that the first end port suspension element 52₁ can be introduced into it. The second docking port suspension element 50₂ and the second end port suspension element 52₂ can be structured in the same way. In FIGS. 6A to 6C the background of insertability is explained. For example, the emptied first casing 12, which is separated from the second casing 16 and is consequently closed (see FIG. 6A), is wound about the first seal device 14, as is shown in FIG. 6B. The first seal device 14 is subsequently bent such that the first docking port suspension element 50₁ and the first end port suspension element 52₁ can be introduced one into the other. In FIG. 6C the first docking port suspension element 50₁ and the first end port suspension element 52₁ are introduced one into the other and connected with one another using a zip tie such that they cannot become detached from one another. The first casing 12 is consequently sealed and cannot roll off again from the first seal device 14.

Figure 7A:
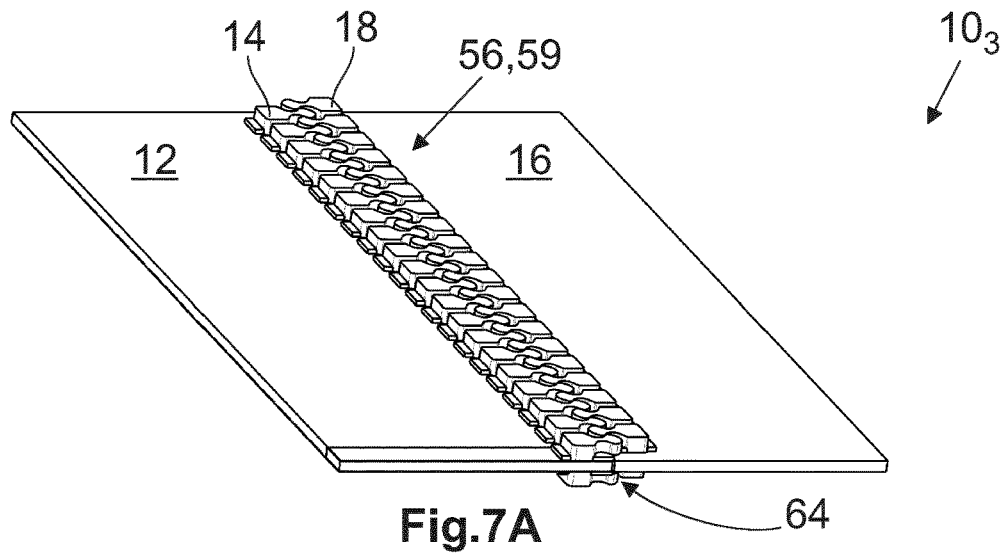
Figure 7B:
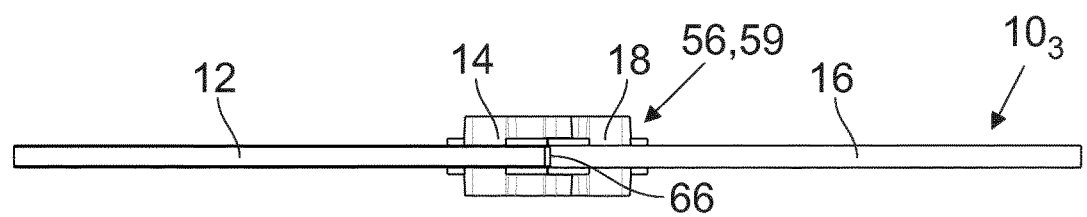

In FIGS. 7A and 7B is shown a third embodiment of the docking seal 10₃ in conjunction with a perspective partial view and in conjunction with a front view. As is evident in FIGS. 3A1 to 3A2, the docking seal 10₃ comprises the slide closure 56 with which the first seal device 14, disposed on the first flexible casing 12, is connectable with the second seal device 18 of the second flexible casing 16. As stated, the slide closure 56 is formed by the third zipper 59. In the third embodiment of the docking seal 10₃ the third zipper 59 comprises sealing means 64 which are brought into sealing contact when the first slider 24 and/or the second slider 30 are slid into the throughflow position and the zipper 59 is closed. In this case, the sealing means 64 are formed by the first flexible casing 12 and the second flexible casing 16 that are implemented and connected with the zipper 59 such that these, when the zipper 59 is closed, abut one another such that each forms a sealing edge 66. The throughflow channel 32 is additionally sealed by the sealing means [64]. It is especially discernible in FIG. 7B that the sealing edges 66 are encompassed by the teeth of the zipper 59. The sealing edges 66 therefore extend within the zipper 59.

The first zipper 55 and the second zipper 57 can analogously be structured such that they also comprise sealing means that become effective when the zippers 55, 57 are closed.

Figure 8A:
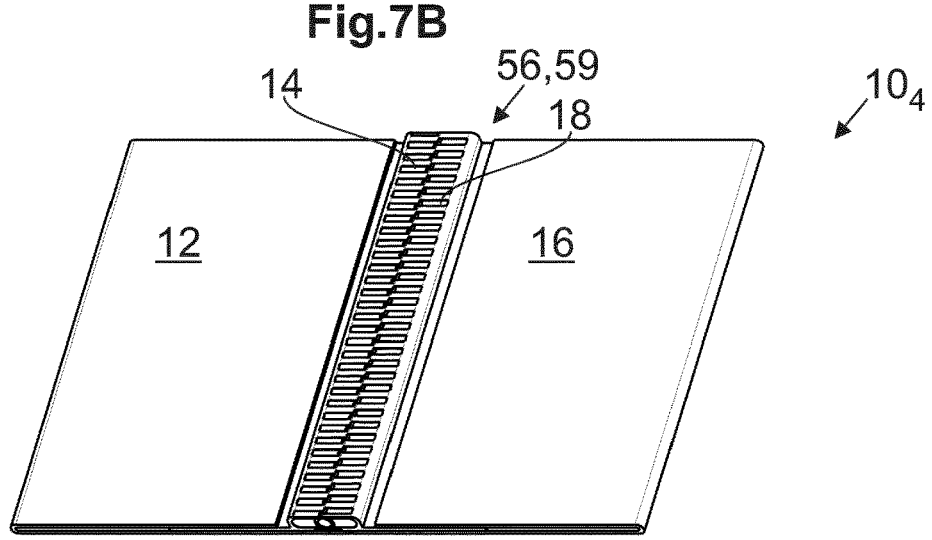
Figure 8B:
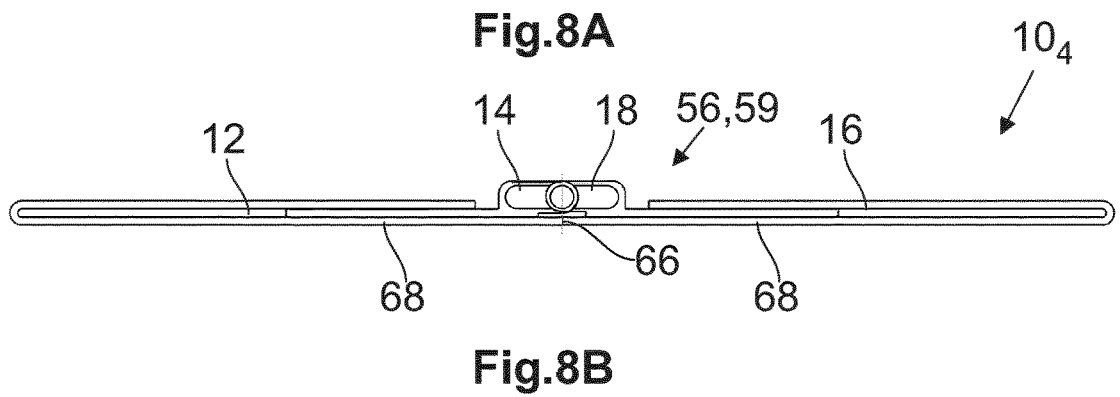

In FIGS. 8A and 8B a fourth embodiment of the docking seal 10₄ is shown in conjunction with a perspective depiction or a front view. The fundamental structure of the docking seal 10₄ according to the fourth embodiment herein corresponds to that of the docking seal 10₃ according to the third embodiment. However, the sealing edge 66 does not extend within the zipper 59 but rather outside thereof. The sealing means 64 are each formed by an additional layer 68 which is applied onto the first flexible casing 12 and the second flexible casing 16. If the third zipper 66 [sic: 59] is closed, the two layers 68 abut one another such that the sealing edge 66 is formed. The two layers 68 can be implemented, for example, as polyethylene coating (PE coating).

LIST OF REFERENCE SYMBOLS

10, 10₁ to 10₄ Docking seal
12 First flexible casing
14 First seal device
16 Second flexible casing
18 Second seal device
20 First docking port
22 First end port
24 First slider
26 Second docking port
28 Second end port
30 Second slider
32 Throughflow channel
34 Form-closure means
36 Hook
38 Positioning section
40 Sleeves
42 Projection
44 Friction-closure means
46 Actuation section
48 Handle piece
50 Docking port suspension element
50₁ First docking port suspension element
50₂ Second docking port suspension element
52 End port suspension element
52₁ First end port suspension element
52₂ Second end port suspension element
54 Teeth
55 First zipper
56 Slide closure
57 Second zipper
58 Centering projection
59 Third zipper
60 Opening
62 Zip tie
64 Sealing means
66 Sealing edge
68 Layer
D Main transit direction

The invention claimed is:

1. A docking seal for the contamination-free connecting of a first flexible casing or enveloping enclosure with a second flexible casing, comprising:
 a first seal device which is connectable or is connected with the first casing, and
 a second seal device which is connectable or is connected with the second casing,
 wherein the first seal device comprises a first docking port, a first end port and a first slider, and
 wherein the second seal device comprises a second docking port, a second end port and a second slider,
 wherein the first slider and the second slider are slidable between a docking position and a throughflow position, wherein in the docking position the first casing within the first seal device-is closed by the latter and the second casing within the second seal device is closed by the latter,
 wherein the first end port and the second end port define a form of the first flexible casing and the second flexible casing by clamping the first flexible casing and the second flexible casing into place,
 wherein the first end port and the second end port serve as an abutment for the first slider and the second slider thereby defining the throughflow position,
 wherein in the docking position, the first slider is in contact on the first docking port and the second slider is in contact on the second docking port,
 wherein the first docking port and the second docking port are detachably connectable with one another,
 wherein the first end port and the second end port are detachably connectable with one another, and
 wherein when the first docking port and the second docking port are connected with one another, the first slider and the second slider during the sliding in the direction toward the throughflow position, in which the first slider is in contact on the first end port and the second slider is in contact on the second end port, the first casing and the second casing open and establish a throughflow channel, encompassed by the first seal device and the second seal device, for the contamination-free transport of a substance between the first casing and the second casing,
 wherein at least one of the docking ports comprises a docking port suspension element.

2. The docking seal as in claim 1, wherein the first slider and the second slide are detachably connectable with one another.

3. The docking seal as in claim 1, wherein the first slider and/or the second slider comprise an actuation section.

4. The docking seal as in claim 1, wherein the docking seal comprises at least one slide closure for the connection of the first seal device with the second seal device, which slide closure is closable by sliding the first slider and/or the second slider into the throughflow position.

5. The docking seal as in claim 4, wherein the slide closure comprises sealing ends which are brought into sealing contact with one another if the first slider and/or the second slider is slid into the throughflow position.

6. The docking seal as in claim 1, wherein at least one of the end ports comprises an end port suspension element.

7. The docking seal as in claim 6, wherein each of the docking port suspension element and the end port suspension element encompass an opening whose plane extends substantially parallel to a main transit direction of the substance between the first casing and the second casing.

8. The docking seal as in claim 7, wherein the docking port suspension element and the end port suspension element are introducible into the other.

9. The docking seal as in claim 1, wherein at least the first docking port and the second docking port comprise positioning sections, corresponding to one another, for the positioning of the docking ports relative to one another.

10. The docking seal as in claim 1, wherein at least the first docking port and the second docking port comprise hooks and/or a friction-closure means for the detachable connection of the docking ports with one another.

11. A docking method for the contamination-free connection of a first flexible casing with a second flexible casing with a docking seal comprising:
 providing a first seal device with a first docking port, a first end port and a first slider,
 providing a second seal device with a second docking port, a second end port and a second slider, wherein the first seal device and the second seal device are in a docking position in which the first casing within the first seal device is closed off by the latter, and the second casing within the second seal device is closed off by the latter, and in which the first slider is in contact on the first docking port, and the second slider is in contact on the second docking port, wherein the first end port and the second end port define a form of the first flexible casing and the second flexible casing by clamping the first flexible casing and the second flexible casing into place, wherein the first end port and the second end port serve as an abutment for the first slider and the second slider thereby defining a throughflow position, connecting the first docking port with the second docking port, connecting the first end port with the second end port, and sliding the first slider and the second slider in the direction toward the throughflow position in which the first slider is in contact on the first end port, and the second slider is in contact on the second end port, whereby the first casing and the second casing are opened and establish a throughflow channel, encompassed by the first seal device and the second seal device, for the contamination-free transport of a substance between the first casing and the second casing, wherein the first slider and the second slider can only move jointly and simultaneously from the docking position to the throughflow position when the first docking port and the second docking port are connected to one another.

12. The docking method as in claim 11, comprising the following step:
connecting the first slider with the second slider.

13. A docking seal for the contamination-free connecting of a first flexible casing or enveloping enclosure with a second flexible casing, comprising:
a first seal device which is connectable or is connected with the first casing, and
a second seal device which is connectable or is connected with the second casing,
wherein the first seal device comprises a first docking port, a first abutment and a first slider, and
wherein the second seal device comprises a second docking port, a second abutment and a second slider,
wherein the first slider and the second slider are slidable between a docking position and a throughflow position,
wherein in the docking position the first casing within the first seal device-is closed by the latter and the second casing within the second seal device is closed by the latter,
wherein the first abutment and the second abutment define a form of the first flexible casing and the second flexible casing by clamping the first flexible casing and the second flexible casing into place,
wherein the first abutment and the second abutment serve as an abutment for the first slider and the second slider thereby defining the throughflow position,
wherein in the docking position the first slider is in contact on the first docking port and the second slider is in contact on the second docking port,
wherein the first docking port and the second docking port are detachably connectable with one another,
wherein when the first docking port and the second docking port are connected with one another, the first slider and the second slider during the sliding in the direction toward the throughflow position, in which the first slider is in contact on the first abutment and the second slider is in contact on the second abutment the first casing and the second casing open and establish a throughflow channel, encompassed by the first seal device and the second seal device, for the contamination-free transport of a substance between the first casing and the second casing,
wherein the first slider and the second slider can only move jointly and simultaneously from the docking position to the throughflow position when the first docking port and the second docking port are connected to one another.

14. A docking seal for the contamination-free connecting of a first flexible casing or enveloping enclosure with a second flexible casing, comprising:
a first seal device which is connectable or is connected with the first casing, and
a second seal device which is connectable or is connected with the second casing,
wherein the first seal device comprises a first docking port and a first slider, and
wherein the second seal device comprises a second docking port and a second slider,
wherein the first slider and the second slider are slidable between a docking position and a throughflow position,
wherein in the docking position the first casing within the first seal device-is closed by the latter and the second casing within the second seal device is closed by the latter,
wherein in the docking position the first slider is in contact on the first docking port and the second slider is in contact on the second docking port,
wherein the first docking port and the second docking port are detachably connectable with one another,
wherein when the first docking port and the second docking port are connected with one another, the first slider and the second slider during the sliding in the direction toward the throughflow position, the first casing and the second casing open and establish a throughflow channel, encompassed by the first seal device and the second seal device, for the contamination-free transport of a substance between the first casing and the second casing,
wherein the first slider and the second slider can only move jointly and simultaneously from the docking position to the throughflow position when the first docking port and the second docking port are connected to one another.

15. The docking seal of claim 1, wherein the first slider and the second slider can only move jointly and simultaneously from the docking position to the throughflow position when the first docking port and the second docking port are connected to one another.

16. The docking method as in claim 11, wherein at least one of the docking ports comprises a docking port suspension element, and wherein at least one of the end ports comprises an end port suspension element.

17. The docking method as in claim 16, wherein each of the docking port suspension element and the end port suspension element encompass an opening whose plane extends substantially parallel to a main transit direction of the substance between the first casing and the second casing.

18. The docking seal as in claim 13, wherein at least one of the docking ports comprises a docking port suspension element.

19. The docking seal as in claim 18, wherein at least one of the end ports comprises an end port suspension element.

20. The docking seal as in claim 19, wherein each of the docking port suspension element and the end port suspension element encompass an opening whose plane extends substantially parallel to a main transit direction of the substance between the first casing and the second casing.

\* \* \* \* \*